United States Patent [19]

Moore et al.

[11] Patent Number: 4,636,700
[45] Date of Patent: Jan. 13, 1987

[54] POSITION SERVO SYSTEM

[75] Inventors: Peter G. Moore, Edinburgh; John D. Davidson, Lothian, both of Scotland

[73] Assignee: Ferranti, plc, Cheshire, England

[21] Appl. No.: 660,312

[22] Filed: Oct. 12, 1984

[30] Foreign Application Priority Data

Oct. 13, 1983 [GB] United Kingdom ............ 8327514

[51] Int. Cl.⁴ .................................................. G05B 5/01
[52] U.S. Cl. .................................. 318/611; 318/620; 318/621; 318/9
[58] Field of Search ............... 318/619, 618, 620, 608, 318/611, 615, 616, 617, 621, 622, 606, 609, 6, 9, 14

[56] References Cited

U.S. PATENT DOCUMENTS

| | | | |
|---|---|---|---|
| 3,493,826 | 2/1970 | Wandrey | 318/621 |
| 3,660,744 | 5/1972 | Plummer | 318/618 X |
| 4,358,842 | 11/1982 | Kimura | 318/615 X |
| 4,430,606 | 2/1984 | Otsuki | 318/616 X |
| 4,439,716 | 3/1984 | Minnich | 318/615 X |

FOREIGN PATENT DOCUMENTS 1145314 1/1967 United Kingdom .

Primary Examiner—William M. Shoop, Jr.
Assistant Examiner—Patrick C. Keane
Attorney, Agent, or Firm—Kerkam, Stowell, Kondracki & Clarke

[57] ABSTRACT

A servo system 10 (FIG. 1) for positioning a sighting mirror 11 connected to a pulley 16 comprises a drive motor 13 rigidly connected to a drive pulley 15 in turn coupled by a tensioned drive belt to the pulley 16. Angular position of the motor or pulley 15 is measured by sensor 18 and passed by way of phase advance network 19 and amplifier 21 to produce an error signal for the drive motor. The pulley 16 is outside of the servo loop and any oscillations induced in the tensioned belt at its resonant frequency, possibly originating from electrical noise in the servo loop, will be uncontrollable. To avoid such oscillation and retain a simple construction the belt tension is set (25) to a value producing a belt resonant frequency outside the operating bandwidth of the servo system and the feedback loop includes a notch filter 20 tuned to the belt resonant frequency which prevents electrical noise in the system from inducing along-axis oscillation of the drive belt and consequential position jittering of the mirror sightline.

4 Claims, 4 Drawing Figures

U.S. Patent   Jan. 13, 1987   4,636,700
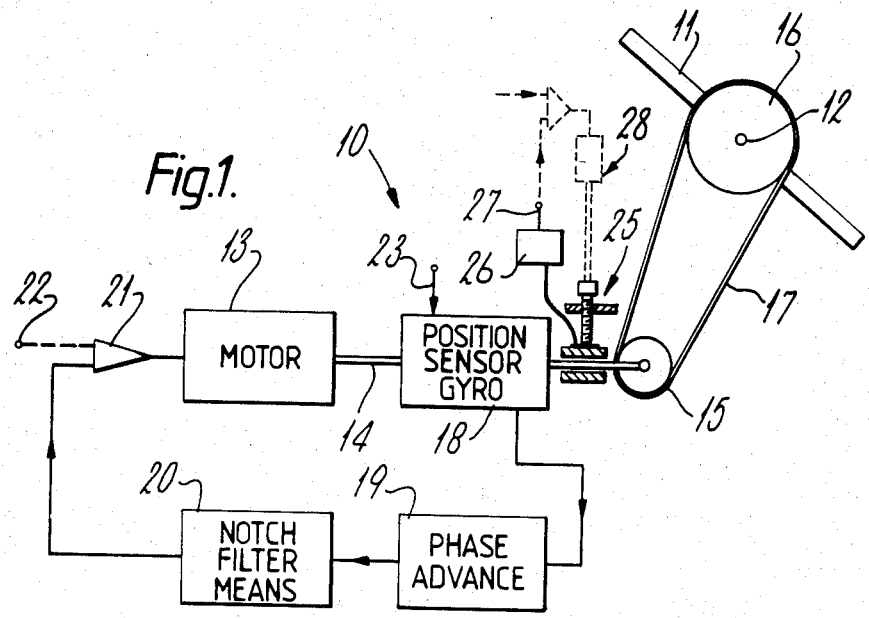
Fig.1.
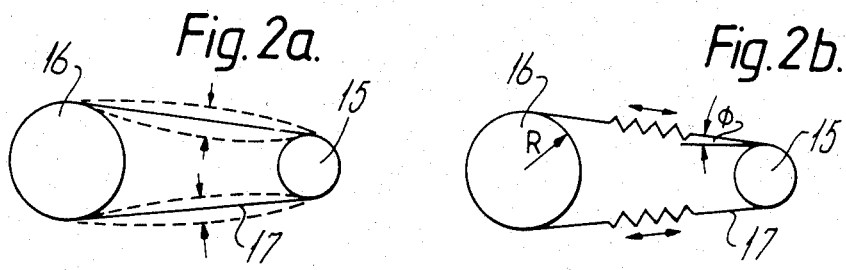
Fig.2a.   Fig.2b.
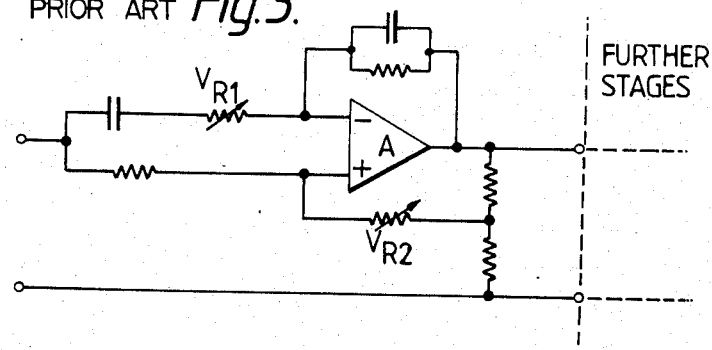
PRIOR ART Fig.3.

POSITION SERVO SYSTEM

This invention relates to position servo systems of the type in which a movable driven member is coupled to a positioning drive motor by a drive belt and in particular to the elimination of positional jitter of the driven member.

A position servo is known in which a drive motor is rigidly coupled to move a rotatable primary driven member which in turn is coupled by a drive belt to move a secondary driven member to a desired position. An electrical feedback control loop between a sensor of the position of the primary driven member and the drive motor maintains, or effects a change in, the position of the primary driven member in terms of a difference between the actual motor position, and a demanded position, determined by an applied signal.

In such a position feedback servo system the operating bandwidth may be relatively low, say 0–50 Hz, but electrical noise generated within the servo loop at higher frequencies and normally resulting only in minor perturbations of the primary driven member may excite vibrations in the drive belt which may resonate and induce oscillating movement of the secondary driven member with respect to the primary driven member, i.e. jitter, which is outside the control loop of the servo.

The jitter may be particularly troublesome in precision servo systems where the drive belt effects a step-up linkage (gearing) between the primary and secondary driven members.

In one example the secondary driven member comprises a pulley, carrying a sighting mirror, to be stabilised by the servo system to within 50 microradians and is coupled by a tensioned metal tape drive belt to a primary driven member pulley of half the diameter (giving a 2:1 step up). Resonance induced within the drive tape may cause a sightline jitter of 1-2 milliradians.

Within a drive belt system as described there are two main modes of vibration possible, transversely to the axis of the belt (equivalent to a vibrating string) and along the longitudinal axis of the belt (equivalent to a stiff spring). It has been found that the resonance excited electrically is principally of the longitudinal mode and it is an object of the present invention to provide a belt drive position servo system in which the effects of this resonant mode are mitigated.

According to the present invention a belt-drive position servo system includes a drive motor rigidly coupled to a primary driven member, a secondary driven member coupled to the primary driven member by a flexible drive belt to be positioned thereby and an electrical feedback control loop between a sensor of the position of the primary driven member and the drive motor including notch filter means operable to attenuate signals in the feedback control loop in a frequency band, displaced from the response band of the servo system, including the resonant frequency of along axis vibrations of the drive belt.

An embodiment of the present invention will now be described by way of example with reference to the accompanying drawings, in which:

FIG. 1 is a schematic electro-mechanical circuit diagram of the servo system according to the present invention employed to stabilise the angular position of a sighting mirror, FIGS. 2(a) and 2(b) are representations of the driven members and drive belt of the system of FIG. 1 to illustrate the modes of resonant vibrations in the belt, and FIG. 3 is a circuit diagram of a notch filter forming part of the notch filter means of the servo system of FIG. 1.

Referring to FIG. 1, a servo system 10 according to the present invention is employed to maintain the angular position of a sighting mirror 11 about an axis 12, the axis being fixed in relation to a gyro stabilised platform carried by a vehicle. The vehicle, platform and means for stabilising its orientation with respect to movements of the vehicle form no part of the invention and are not shown.

The platform carries, fixed in relation thereto, a drive motor 13 having a rotatable drive shaft 14 on which is mounted a primary driven member 15 in the form of a pulley. The axis of rotation of the drive shaft 14 and the mirror 12 are parallel and the mirror carries a secondary drive member 16, also in the form of a pulley, coupled to the primary driven member by a drive belt 17 by which the secondary driven member and mirror can be rotated about the axis 12.

The drive belt 17 is in the form of a metal tape held in tension by adjustable clamping means 25 to fix the axle positions, and thus the separation, of the two driven members. Where the axis 12 is part of an optical path it is preferable to make adjustment to the primary driven member 15, such as by way of its drive shaft 14 as shown. The secondary driven member 16 is twice the diameter of the primary driven member giving a step-up 'gearing' of 2:1.

The motor shaft 14 is coupled to a shaft angle position sensor 18 which for precisely representing angular displacement is formed by a rate integrating gyro.

An output signal of the sensor representing angular position is fed by way of a phase advance means 19 to band attenuation, or notch filter, means 20, described in detail hereinafter with reference to FIG. 3, and thence to an amplifier 21. The output of amplifier 21 provides drive to the drive motor 13.

The rotational position of the secondary driven member is a function of a position demand signal fed into the servo loop, either at a second input 22 to amplifier 21, where the difference between it and the feedback signal forms an error signal, or by applying a torquing signal at 23 to the sensor gyro.

For normal positioning of the secondary driven member in response to host vehicle movements the notch filter means 20 is 'transparent' as will be explained hereinafter and the system behaves as a simple known position feedback servo system.

It will be appreciated that the portion of the system after the primary driven member i.e. the drive belt and secondary driven member is outside the closed servo loop and any motion therein relative to the primary driven member cannot be controlled by normal servo action.

The principle source of such relative movement is vibration of the drive belt and although such vibrations are generally small at certain frequencies resonance occurs and the amplified vibrations induce a corresponding vibration or positional jitter in the secondary driven member.

There are two main modes of drive belt vibration which will be considered with reference to FIGS. 2(a) and (b).

The first mode of vibration is transversely to the longitudinal axis of the belt and illustrated in FIG. 2(a).

The frequency of resonant vibration can be calculated as described in the text books for any simple vibrating string arrangement.

The second mode of vibration is along the longitudinal axis of the belt as illustrated in FIG. 2(b), the belt acting as a stiff spring.

It can be shown that the resonant frequency ω can be found from formula $$\omega = [(2KR^2 \cos \phi)/I_m]^{0.5}$$

where

K is the stiffness of the belt

R is the radius of the secondary driven member pulley

φ is the angle of the tape to the line of pulley centres, and $I_m$ is the inertia of the secondary driven member.

The first and, sometimes second, mode of vibration may be caused by vibration of the host vehicle or like mechanical forces and where such vibrations exist at a resonant frequency of the belt such resonant vibration may be eliminated by changing the tension within the belt.

The second mode of vibration may, however, be induced as a result of electrical noise within the servo system. Such noise provides a small error signal to the motor which displaces the primary driven member accordingly, whereupon the sensor reacts and its signal may be modified by the noise to apply a restoring signal to the motor.

It will be appreciated that in general such motion is due to uncorrelated noise signals having components largely frequencies above the operating band width of the servo system and produces little oscillating effect on the primary driven member.

At the resonant frequency of the belt, however, oscillating motion of the primary driven member acting along the drive belt (the other end of which may initially be considered fixed by the relatively large inertia of the secondary driven member) can cause such oscillation to increase in amplitude until the reaction on the primary driven member generates a correlated displacement signal from the sensor which reverses the drive direction of motor 13. Thus an oscillating motion of the primary driven member and belt may be quickly established, transferring the oscillatory motion to the secondary driven member which causes positional jitter of the scanning mirror 11.

Clearly the electrical noise spectrum may be wide and it is not possible just to vary the resonant frequency of the drive belt to avoid the effect.

In accordance with the present invention the tension in the belt is chosen to produce a resonant frequency for along-axis vibrations in the belt greater than the upper limit of the bandwidth of the servo system, as dictated by positioning the secondary drive member, and the notch filter means 20 has a bandwidth chosen to provide an attenuation 'notch' centred on the resonant frequency.

It will be appreciated that for normal servo operation the notch filter is transparent to feedback signals but any electrical noise generated in the electrical feedback signal at the resonant frequency is blocked before a mechanical oscillation can become established.

The notch filter means 20 may take any one of a number of known forms and is preferably an active circuit.

One example of a notch filter circuit of known form is shown in FIG. 3, as published in an article entitled "Active Notch Filter" by Yishay Nezer in Wireless World, July 1975, pages 307-311.

The circuit comprises an operational amplifier A with passive input and feedback components including two variable resistors $VR_1$ and $VR_2$ by which the centre frequency of the 'notch' can be tuned.

Two such notch filters in cascade provides a suitable degree of attenuation and bandwidth for the notch filter means, of the order of 40 dB with a spread of about ±10 Hz [centred at about 350 Hz].

Clearly any suitable filter means incorporating desired design criteria as to notch frequency and width may be employed.

The notch filter means may be located anywhere in the feedback control loop, that is between sensor 18 and amplifier 21, to attenuate any tendency for signals to build up at the resonant frequency but if the phase advance circuit 19 includes a gain element which would serve to amplify noise signals the notch filter is preferably located as the final element before the motor driving amplifier 21.

As stated, in the embodiment described the drive belt 17 is a tensioned metal tape and the sensor 18 a rate integrating gyro. Such components in combination with precision pivotal bearings enables a servo system to be constructed offering great positional accuracy to the secondary driven member, say 50 microradians.

The attenuation, or notch, frequency of the filter means, and the drive belt resonance, is chosen to be sufficiently greater than the response bandwidth of the servo system to avoid introducing any instability therein. In this example the servo system has a bandwidth of 0-50 HZ so that a resonant frequency in excess of about 150 Hz is suitable, one value used being approximately 350 Hz.

The adjustable clamping means 25 which effects tensioning of the drive belt may take any convenient form other than the simple screw adjuster. Also the clamping means may be provided with means for measuring the actual tension in the drive belt 17, such as a strain gauge 26 giving a readable indication or corresponding output signal at 27, enabling precise adjustment of the resonant frequency. If operating conditions result in variations in tension and consequential drift of resonant frequency the measured 'tension' output at 27 may be used in a separate closed loop servo 28 to control the clamping means 25 and thus maintain a demanded level of belt tension.

It will be appreciated that alternatives to the other elements shown may also be employed. For example the sensor may be a less sophisticated angle resolving pick-off and the drive belt may be other than a metal tape. Furthermore the system is not limited to use with rotary motion, where the primary and secondary driven members are pulleys, but may for instance be employed where coupling between linearly displaceable members is effected by a drive belt.

We claim:

1. A belt driven position servo system including a drive motor rigidly coupled to a primary driven member, a secondary driven member coupled to the primary driven member by a flexible drive belt to be positioned thereby and an electrical feedback control loop between a sensor of the position of the primary driven member and the drive motor including notch filter means operable to attenuate signals in the feedback control loop in a frequency band, displaced from a response band of the servo system, including the resonant frequency of along axis vibrations of the drive belt.

2. A system as claimed in claim 1 including means to alter the tension of the drive belt to change the resonant frequency of the vibrations therein.

3. A system as claimed in claim 1 in which the notch filter means comprises a cascaded arrangement of active notch filter circuits.

4. A system as claimed in claim 1 in which the drive motor produces a rotary motion imparted to the primary driven member and in which the sensor of the position of the primary driven member comprises a rate integrating gyro.

* * * * *